United States Patent
Mies et al.

(10) Patent No.: US 8,214,074 B2
(45) Date of Patent: Jul. 3, 2012

(54) DEVICE AND METHOD FOR POSITIONING A ROTATIONALLY-SYMMETRIC PRECISION PART

(75) Inventors: Georg Mies, Wipperfürth (DE); Günter Mikoleizig, Hückeswagen (DE); Frank Wellmann, Hückeswagen (DE); Harald Wüster, Radevormwald (DE)

(73) Assignee: Klingelnberg AG, Zürich (CH)

( * ) Notice: Subject to any disclaimer, the term of this patent is extended or adjusted under 35 U.S.C. 154(b) by 325 days.

(21) Appl. No.: 12/625,610

(22) Filed: Nov. 25, 2009

(65) Prior Publication Data

US 2010/0138006 A1 Jun. 3, 2010

(30) Foreign Application Priority Data

Nov. 28, 2008 (EP) ..................................... 08170170

(51) Int. Cl.
*G06F 19/00* (2006.01)
(52) U.S. Cl. ........................ 700/194; 700/280
(58) Field of Classification Search .................. 700/194, 700/192, 280, 57; 356/614, 623; 33/504, 33/502; 318/652
See application file for complete search history.

(56) References Cited

U.S. PATENT DOCUMENTS

| | | | |
|---|---|---|---|
| 4,218,825 A | | 8/1980 | Asakura et al. |
| 4,731,934 A | * | 3/1988 | Barnaby et al. ................ 33/504 |
| 5,208,763 A | * | 5/1993 | Hong et al. ...................... 702/95 |
| 5,455,870 A | * | 10/1995 | Sepai et al. .................... 382/147 |
| 5,529,441 A | * | 6/1996 | Kosmowski et al. ......... 408/1 R |
| 6,763,281 B2 | * | 7/2004 | Schauer et al. ................ 700/218 |
| 2004/0035266 A1 | * | 2/2004 | Montesanti et al. ........... 82/1.11 |
| 2005/0204571 A1 | * | 9/2005 | Mies et al. ...................... 33/503 |

FOREIGN PATENT DOCUMENTS

| | | |
|---|---|---|
| DE | 19631620 A1 | 2/1998 |
| DE | 102006023926 A1 | 11/2007 |
| DE | 102006041886 A1 | 3/2008 |
| EP | 0377796 A2 | 7/1990 |
| WO | 02/101792 A2 | 12/2002 |

* cited by examiner

*Primary Examiner* — Kidest Bahta
(74) *Attorney, Agent, or Firm* — McCormick, Paulding & Huber LLP (57) ABSTRACT

Device and method for positioning a precision part on a turntable (130). The device (100) comprises at least two distance sensors (121.1, 121.2, 121.3), which operate in a contactless manner and are situated in a previously known configuration to a rotational axis (A1) of the turntable (130). The measurement axes (124.1, 124.2, 124.3) of the distance sensors (121.1, 121.2, 121.3) are radially oriented in the direction of the rotational axis (A1) so that the measurement axes (124.1, 124.2, 124.3) of the distance sensors (121.1, 121.2, 121.3) meet in a virtual measuring point (MV). The distance sensors (121.1, 121.2, 121.3) are connected to analysis electronics (200). Output signals (a.1, a.2, a.3) of the distance sensors (121.1, 121.2, 121.3) may be processed on the basis of the analysis electronics (200), in order to allow coaxial centering of the precision part (11) in relation to the rotational axis (A1) upon placement of the precision part (11) on the turntable (130).

14 Claims, 6 Drawing Sheets

DEVICE AND METHOD FOR POSITIONING A ROTATIONALLY-SYMMETRIC PRECISION PART

CROSS REFERENCE TO RELATED APPLICATION

This application claims the benefit of European Application No. 08 170 170.8, filed Nov. 28, 2008, the disclosure of which is herein incorporated by reference in its entirety.

The invention relates to devices, such as measuring devices or machine tools, and methods for the precise positioning of precision parts, preferably large and heavy rotationally-symmetric precision parts.

BACKGROUND OF THE INVENTION

There are numerous machining methods for producing gearwheels and other rotationally-symmetric precision parts. The precision part is typically measured during or after the machining.

Figure 1:
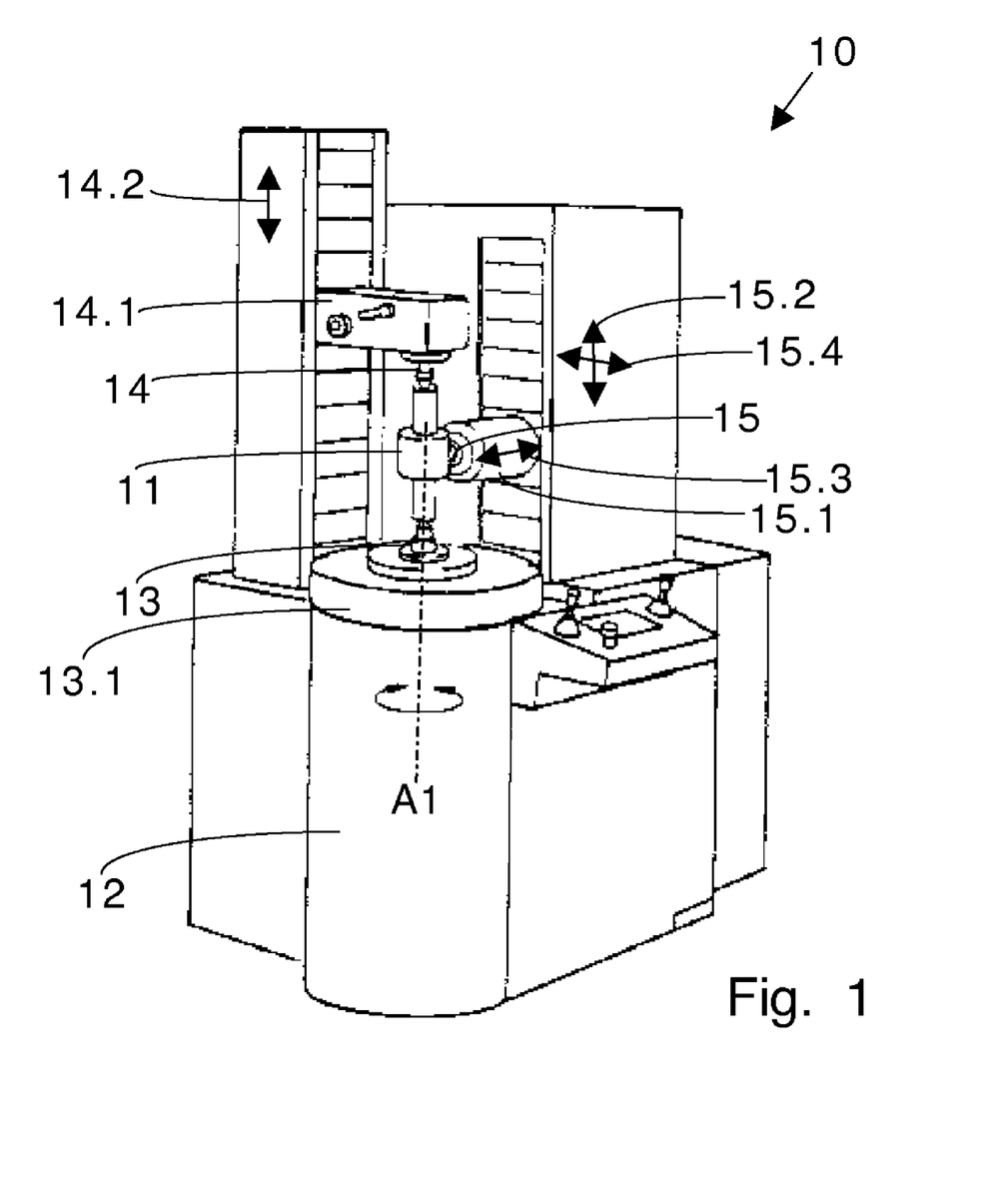
FIG. 1 shows a previously known measuring system.

In order to be able to test the precision of the machining of a precision part after the machining, the precision part 11 can be removed from the machine tool and chucked in a special measuring system 10, for example, where it is scanned and measured using sensors 15, as indicated in FIG. 1. Numerically controlled measuring devices 10 are preferably used for this purpose. A rotationally-symmetric precision part 11 is typically chucked between a lower centering tip 13 and an upper centering tip 14 for the measurement. The lower centering tip 13 is seated on a turntable 13.1, which can be moved precisely into various angular positions by a drive. The precision part 11 is pressed against the lower centering tip 13 because of its intrinsic weight and the contact pressure which originates from the upper centering tip 14. The centering tip 13 has a rotational axis which runs coaxially to the first rotational axis A1. An arm 14.1 is preferably provided, which can be displaced vertically, as indicated by the double arrow 14.2. The upper centering means 14 is mounted within the arm 14.1 so that it can rotate easily around a vertical axis which is congruent with the rotational axis A1. The measuring device 10 comprises, as shown in FIG. 1, at least one sensor 15 for three-dimensional measurement (referred to as a 3-D scanning system) of the precision part 11 chucked in the measuring system 10. An arm 15.1 is preferably provided, which can be displaced vertically, as indicated by the double arrow 15.2. In addition, the sensor 15 can execute a feed movement, as indicated by the two double arrows 15.3 and 15.4 perpendicular to one another.

The published German patent application DE 10 2006 041 886 A1 concerns a robot-based system for the positioning of workpieces. A measuring device is employed in order to determine the actual position of the workpiece and the robot is caused to move the workpiece to adjust the position.

An apparatus for centering a workpiece in a lathe turning machine is disclosed in JP 06 039683 A. Four radially oriented actuators are positioned around a diskshaped workpiece. These actuators serve as position correcting means. One sensor is employed to determine whether the rotational axis of the workpiece is co-axially aligned with the rotation axis of the lathe. In case the workpiece is found to be not properly centered, the position correcting means are caused to correct the position of the workpiece.

Another apparatus for centering a cylindrical workpiece in a lathe turning machine is disclosed in U.S. Pat. No. 4,218, 825. The cylindrical workpiece is mounted on a turn table. The positions of reference points on the periphery of the workpiece are determined and deviations are calculated using angular information. Press-members serve as position correcting means. These press-members apply a force to move the workpiece into a centered position.

The document WO 02/101792 discloses an alignment tool for aligning a robot blade which carries a workpiece. The respective system is designed in order to be able to determine the orientation of a workpiece.

The published German patent application DE 196 31 620 A1 discloses a grinding machine and means for determining the actual position of a gear wheel in such a machine. The determination of the position is carried out in order to use the data so obtained for the machining of the gear wheel. That is the data are transferred into the coordinate system of the machine and are used to perform a correction or do a compensation of machine movements in case of a misaligned gear wheel.

A system for quantitatively and qualitatively determining the spatial position of two objects is disclosed in the published German patent application DE 10 2006 023 926 A1. The system comprises a laser transmitter which emits a light beam which is split into several beams. Several row or line sensors are employed for determining the positions where the respective beams impinge.

The document EP 0 377 796 A2 discloses another approach with three sensors to align a cylindrical workpiece which is horizontally oriented.

Experience has shown that with large and heavy precision parts, such a construction having a lower centering tip 13 and an upper centering tip 14 is not capable of being able to precisely orient the precision part 11 before the measurement.

The need is increasingly expressed for being able to measure precision parts having large diameter and high weight. In addition, an important requirement for measurements of this type is that they are performed very precisely, on the one hand, but also as rapidly as possible, on the other hand.

The typical measuring systems do not meet such requirements. Even small deviations, which result because of imprecise placement of the precision part in the measurement structure, result in large measurement inaccuracies. This is also true for the placement of large workpieces in machine tools. The introduction (setup) of a large and heavy workpiece is also often problematic and time-consuming here.

It is an object of the invention to provide a device and a corresponding method in order to allow the rapid and reliable placement of larger and/or heavier precision parts.

In particular, the object is to be achieved by the present invention of improving a measuring device, e.g., a numerically controlled measuring device (CNC measuring device) so that it is capable of rapid complete measurement of a large and/or heavy precision part, such as a gearwheel, and the measuring device nonetheless has a simple and operationally-reliable construction.

In particular, the object is to be achieved by the present invention of improving a machining device, such as a numerically controlled machine tool (CNC gear cutting center), so that it is capable of rapid gear cutting of a large and/or heavy precision part, such as a gearwheel, and nonetheless has a simple and operationally-reliable construction.

The object is achieved by a device and by a method of the present invention.

The subjects of claims form advantageous embodiments of the device and method according to the invention.

SUMMARY OF THE INVENTION

The invention relates to a device and a method for positioning a precision part on a turntable. The device comprises at least two, but preferably three distance sensors operating in a contactless manner, which are situated in a previously known geometric configuration around the turntable. The measurement axes of the distance sensors are oriented radially in the direction of the rotational axis so that the measurement axes of the distance sensors meet in a virtual measuring point. The distance sensors are connected to analysis electronics. Output signals of the distance sensors may be processed on the basis of the analysis electronics, in order to allow coaxial centering of the precision part in relation to the rotational axis upon placement of the precision part on the turntable.

In particular, the present patent application relates to CNC-controlled gear cutting measuring machines, which are capable of checking spur gear teeth and bevel gears, cutting and rasping wheels, worms and worm wheels, hobs, bevel gears, and general dimensional, shape, and position deviations on rotationally-symmetric workpieces, curve and camshaft measurement or also rotor measurement. However, it also relates to machine tools.

The invention may be used particularly advantageously in the devices discussed herein.

BRIEF DESCRIPTION OF THE DRAWINGS

Exemplary embodiments of the invention are described in greater detail hereafter with reference to the drawings. In the figures.

DESCRIPTION OF THE PREFERRED EMBODIMENTS

Terms are used in connection with the present description which are also used in relevant publications and patents. However, it is to be noted that the use of these terms is only to serve for better understanding. The inventive ideas and the protective scope of the patent claims is not to be restricted in its extent by the specific selection of the terms. The invention may be readily transferred to other term systems and/or areas of specialization. The terms are to be applied accordingly in other areas of specialization.

The term "coaxial" is the title in geometry for corresponding axes of three-dimensional elements. This term is also used in this meaning in connection with the present invention.

So-called "rotationally-symmetric precision parts" are discussed in connection with the present invention. It is to be noted here that the entire precision part does not necessarily have to be implemented as rotationally-symmetric, of course, in order to fall under the term "rotationally-symmetric precision part". For a spur gear, for example, the gearing is situated concentrically around the rotational axis of the spur gear, but the location and shape of the individual teeth is not rotationally symmetric to the rotational axis. Nonetheless, such gearwheels, and also other precision parts, frequently have at least one rotationally-symmetric surface. This can be an outer surface of a coaxial shaft, a shank, or an inner surface which is produced by drilling, turning, grinding, or milling, for example. In the meaning of the present invention, all precision parts which have at least one rotationally-symmetric surface are referred to as rotationally-symmetric precision parts here.

This particularly relates to large and/or heavy rotationally-symmetric precision parts. Such precision parts have a diameter which is significantly greater than 1 m, for example. The weight is at least 100 kg, but can also be up to 30 tons. For example, these can be large-module bevel gears, having up to 6 m external diameter.

Figure 2:
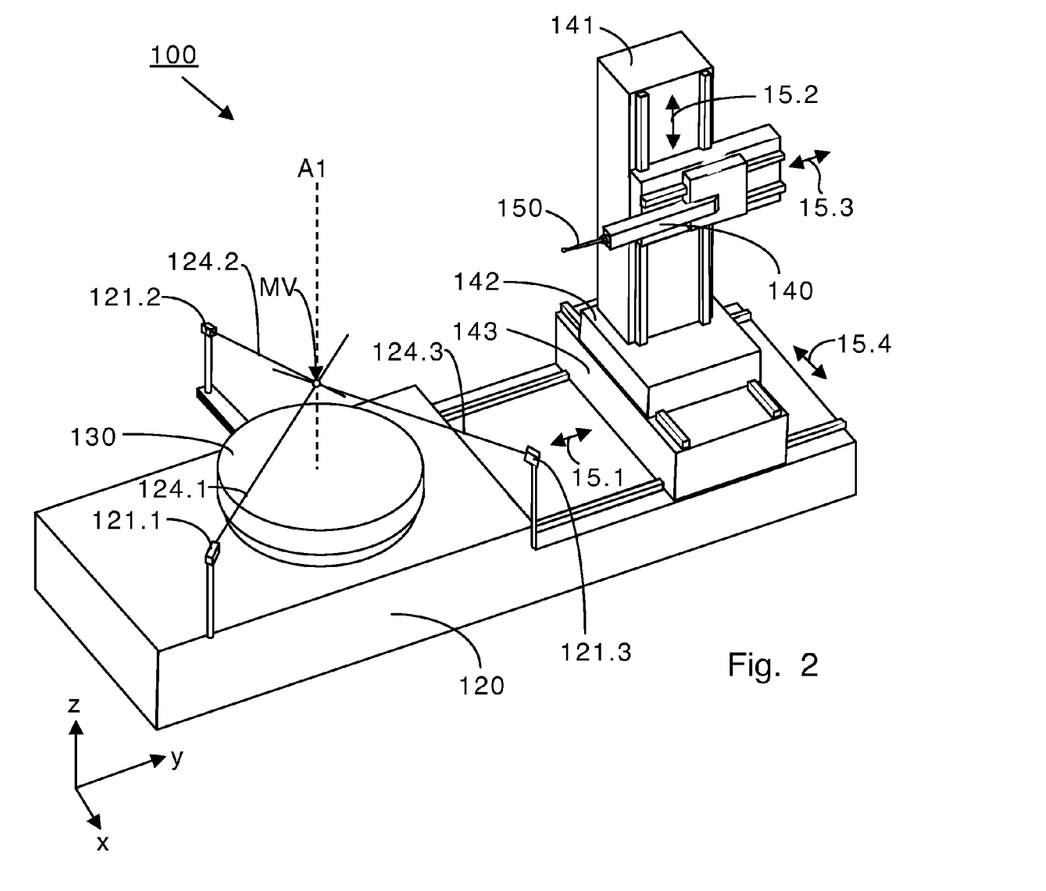
FIG. 2 shows a perspective view of a first measuring device according to the invention.

An advantageous embodiment of the invention, which is shown in FIG. 2, relates to a fully-automatic, CNC-controlled gear cutting measuring center 100, which is also referred to more generally here as a device 100 or as a measuring device 100. The device 100 is capable of chucking large and/or heavy spur gear teeth and bevel gears, cutting and rasping wheels, worms and worm wheels, hobs, bevel gears, and general dimensional, shape, and position deviations on rotationally-symmetric workpieces, curve and camshaft measurement or also rotor measurement, to list only a few possible uses.

The device 100 comprises a turntable 130, which is drivable via an actuator (not visible). The turntable 130 is located in the so-called measuring area or measuring chamber of the measuring device 100. This measuring area is distinguished in that it is reachable by the measuring head (e.g., a measuring feeler 150). The turntable 130 has a rotational axis which is identified here as a central, vertical rotational axis A1. The turntable 130 is situated on a machine bed 120 or foundation so that a precision part 11 to be measured can be placed coaxially on the turntable 130 (i.e., the rotational axis A2 of the precision part 11 is coincident with the rotational axis A1 of the turntable 130).

A measuring tower 141 is preferably provided with an arm 140, which can be displaced vertically, as indicated by the double arrow 15.2. In addition, the arm 140 can be extended and retracted, as indicated by the double arrow 15.3. The measuring tower 141 can be seated on a lateral carriage 142, which is displaceable forward and back, as indicated by the double arrow 15.4. This lateral carriage 142 can in turn be situated on a second lateral carriage 143 (also referred to as a feed carriage), which is laterally displaceable along the machine bed 120, as indicated by the double arrow 15.1.

The measuring device 100 comprises, as shown in FIG. 2, at least one sensor 150 for the three-dimensional measurement (3-D scanning system) of the precision part placed in the measuring device 100. The sensor 150 is preferably seated on the arm 140. The sensor 150 can execute various feed movements, as indicated by the double arrows 15.1-15.4. The sensor 150 is extremely sensitive and it is important during rapid measurement that the sensor 150 does not collide with the precision part upon feeding and/or upon measurement or upon rotation of the precision part around the vertical axis A1.

The effort for placing a large and/or heavy precision part on the turntable 130 very precisely in the measuring area is enormously great. It sometimes takes up to one hour to place a large and heavy precision part precisely on the turntable 130. It is not possible or it is only possible in a limited way to work using the typical drivers and centering means (see FIG. 1) here.

Another path was followed according to the invention in order to allow rapid and nonetheless precise placement, as explained in greater detail hereafter.

Figure 3:
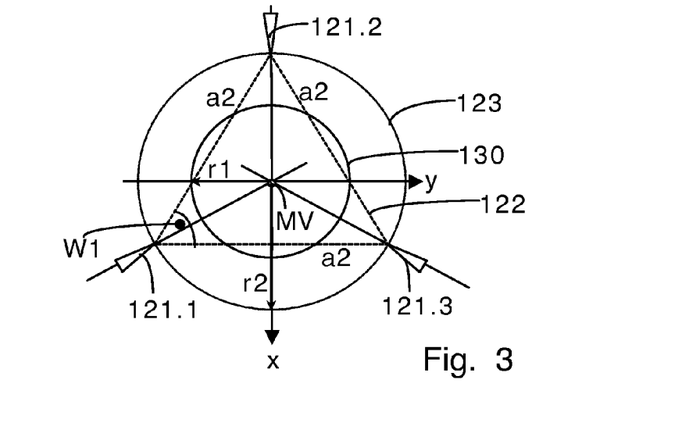
FIG. 3 shows a schematic illustration, which shows a possibility for positioning the distance sensors according to the invention.

In a first advantageous embodiment, the measuring device 100 is equipped with analysis electronics 200 (see FIG. 4) and with three distance sensors 121.1, 121.2, and 121.3, which operate in a contactless manner. These distance sensors 121.1, 121.2, and 121.3 are situated in a previously known geometrical configuration around the measuring area. This configuration is preferably selected so that the distance sensors 121.1, 121.2, and 121.3 are situated at equidistant mutual distances a2 around the measuring area, as indicated in FIG. 3. FIG. 3 shows a top view of the turntable 130 and the distance sensors 121.1, 121.2, 121.3 in an x-y coordinate system (it is preferably the same coordinate system as in FIG. 2 and FIG. 5A). The three legs having the length a2 form an equilateral triangle 122 in this exemplary embodiment. The three legs having the length a2 form secants in an auxiliary circle 123. This auxiliary circle 123 has a radius r2, which corresponds to the distance of the distance sensors 121.1, 121.2, and 121.3 from the rotational axis A1. The mutual angle W1 between the distance sensors 121.1, 121.2, and 121.3 is 60° here.

In FIG. 3, the distance sensors 121.1, 121.2, and 121.3 are indicated in a top view by three small acute triangles, in order to be able to show their "viewing direction". The turntable 130 preferably has a plate shape, the radius of the plate being identified by r1. According to the invention, the following ratio applies: r2 is preferably between approximately 200% and approximately 300% of r1. For a turntable 130 having a radius r1 of 0.8 m, the preferred radius r2 is thus between approximately 1.60 m and approximately 2.4 m.

According to the invention, the measurement axes 124.1, 124.2, 124.3 of the three distance sensors 121.1, 121.2, and 121.3 are oriented radially in the direction of the central rotational axis A1 so that all three measurement axes 124.1, 124.2, 124.3 meet at a single virtual measuring point MV, which is on the rotational axis A1. This virtual measuring point MV is identified in the figures by a small circle. A similar approach applies even if only two distance sensors are used.

The angle of inclination W2 (see FIG. 7) of the distance sensors 121.1, 121.2, and 121.3 is preferably between 2 and 30°. Angles of inclination W2 between 5 and 15° have proven themselves in particular. In general, the rule applies here that the 3-D measurement axes 124.1, 124.2, 124.3 (or the two measurement axes if only two distance sensors are used) of the distance sensors 121.1, 121.2, and 121.3 form a virtual scanning cone, whose scanning tip lies in the virtual point MV. The head angle of this scanning cone becomes more and more acute if the angle of inclination W2 becomes greater. The virtual scanning cone can penetrate deeper from below into the interior of a hole, for example, in order to scan measurement points on a rotational surface therein. This does increase the flexibility of the usability of the device 100, but also results in less precise measurements. The specified angle ranges for W2 were established, as indicated above, in order to find a good compromise, which allows all common precision parts to be scanned as much as possible and nonetheless sufficient precision to be ensured.

The distance sensors 121.1, 121.2, and 121.3 preferably all have an identical radial distance r2 to the rotational axis A1, in order to allow simple analysis of the output signals a.1, a.2, a.3 of the distance sensors 121.1, 121.2, and 121.3. It is also possible to situate the distance sensors 121.1, 121.2, and 121.3 at different distances to the rotational axis A1. If these three distances are known, the output signals a.1, a.2, a.3 of the distance sensors 121.1, 121.2, and 121.3 can be related to one another on the basis of simple geometric and trigonometric observations, in order to be able to make a statement about the eccentricity (as a measure for the deviation from the ideal coaxial centering) of a precision part 11.

The distance sensors 121.1, 121.2, and 121.3 preferably all have an identical angular distance of 120° to one another, in order to allow simple analysis of the output signals a.1, a.2, a.3 of the distance sensors 121.1, 121.2, and 121.3. It is also possible, however, to situate the distance sensors 121.1, 121.2, and 121.3 at different angular distances to one another. If these three angular distances are known, the output signals a.1, a.2, a.3 of the distance sensors 121.1, 121.2, and 121.3 can be related to one another on the basis of simple geometric and trigonometric observations in order to be able to make a statement about the eccentricity (as a measure for the deviation from the ideal coaxial centering) of a precision part 11.

It is thus important according to the invention that the geometric configuration of the distance sensors (two or three in number) is previously known, in order to be able to relate the output signals of the distance sensors to one another using geometric and trigonometric observations, in order to be able to make a statement about the eccentricity (as a measure for the deviation from the ideal coaxial centering) of a precision part 11.

Figure 5A:
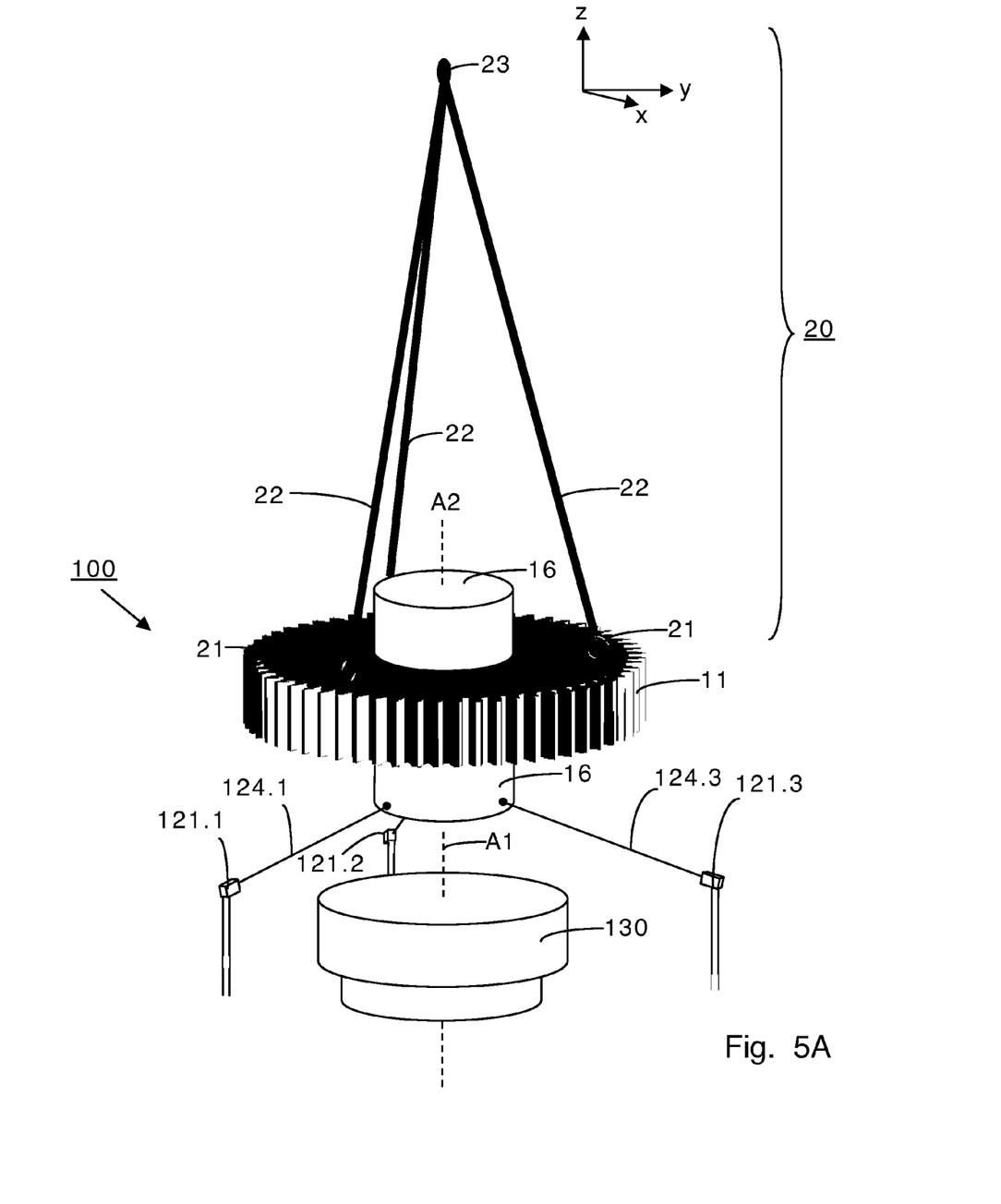
FIG. 5A shows a further perspective partial view of a first measuring device, including a part of a supply device, according to the invention.
Figure 5B:
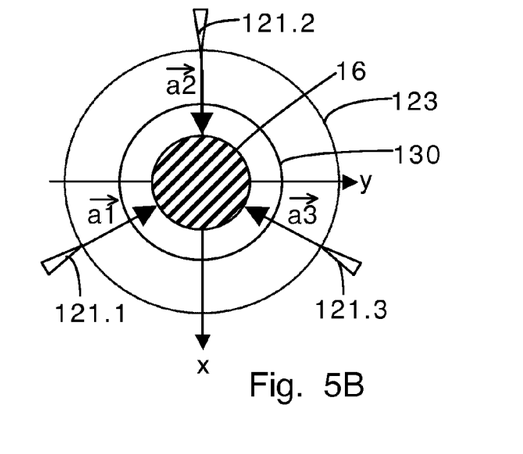
FIG. 5B shows a schematic illustration of the situation shown in FIG. 5A.
Figure 5C:
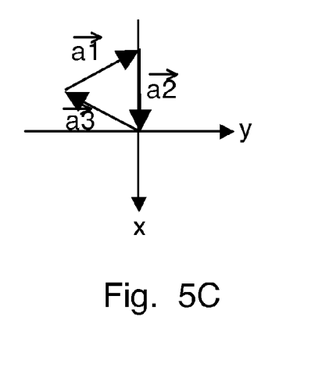
FIG. 5C shows a schematic illustration, which shows a superposition of the three vectors from FIG. 5B.
Figure 6A:
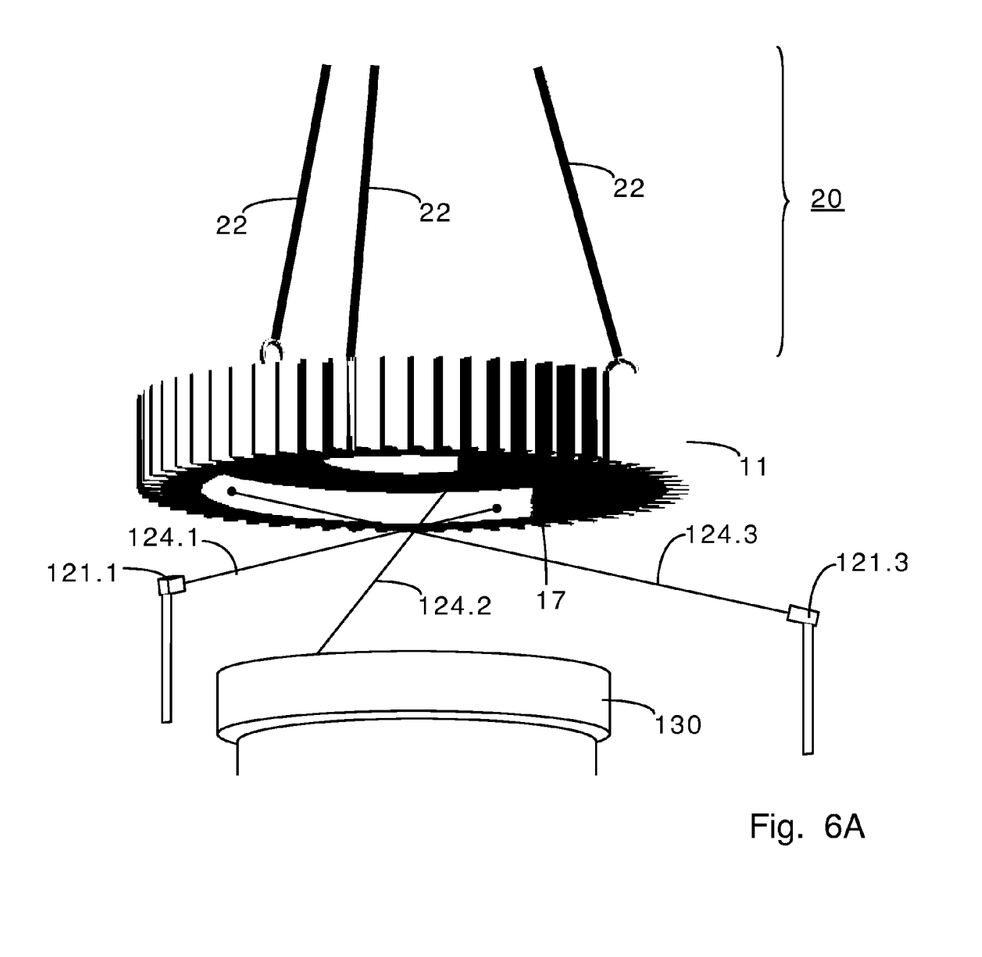
FIG. 6A shows a further perspective partial view of a first measuring device, including a part of a supply device, according to the invention.
Figure 6B:
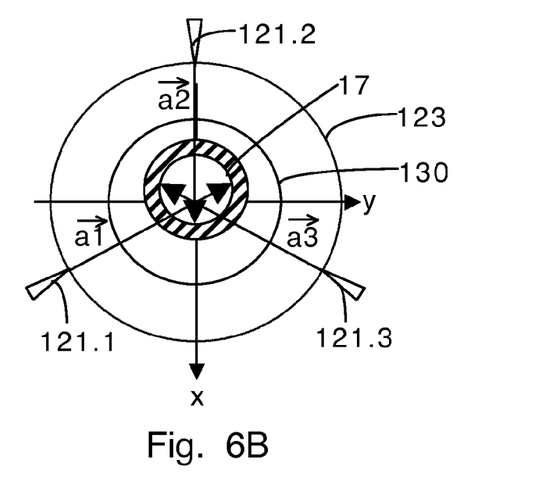
FIG. 6B shows a schematic illustration of the situation shown in FIG. 6A.
Figure 6C:
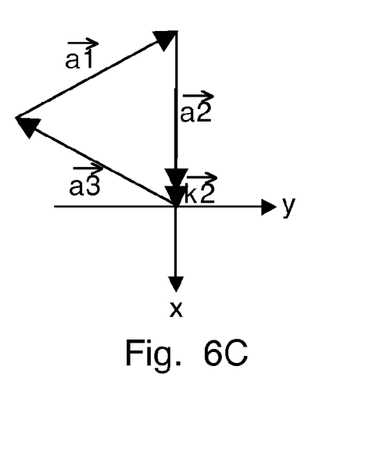
FIG. 6C shows a schematic illustration, which shows a superposition of the three vectors from FIG. 6B.

According to the invention, the output signals a.1, a.2, a.3 of the two or three distance sensors 121.1, 121.2, and 121.3 are processable using the analysis electronics 200, in order to allow the coaxial centering of the precision part 11 in relation to the rotational axis A1 upon placement of the precision part 11 in the measuring area, as illustrated in FIGS. 5 and 6 on the basis of two different precision parts 11.

Distance sensors 121.1, 121.2, 121.3 which operate optically are particularly preferred. These optical sensors 121.1, 121.2, 121.3 achieve sufficiently high precision and are particularly simple and intuitive to handle. Laser sensors 121.1, 121.2, 121.3 are very particularly preferred, which measure the distance to the precision part 11 using runtime measurement. These distance sensors 121.1, 121.2, 121.3 direct laser light along the measurement axes 124.1, 124.2, 124.3 on a rotationally-symmetric surface 16 or 17 of the precision part 11. For this purpose, the invention makes use of the fact that even gearwheels, worms, rotors, and the like typically have rotationally-symmetric surfaces which can be optically scanned when the precision part 11 is placed from above on the turntable 130 using a supply device 20.

Laser sensors 121.1, 121.2, 121.3 which emit light in the visible wavelength range are very particularly preferred. This has the advantage that the light points on the precision part 11 are visible to the operator. The handling capability thus becomes more intuitive and rapid.

A situation is shown in FIG. 5A, in which an externally-toothed cylindrical gearwheel 11 having a cylindrical shaft 16 is placed on the turntable 130. The light beams (which run along the measurement axes 124.1, 124.2, 124.3) of the optical distance sensors 121.1, 121.2, 121.3 (preferably laser sensors 121.1, 121.2, 121.3) are incident on the cylindrical peripheral surface of the shaft 16 and are each reflected back, which allows a runtime measurement in each of the distance sensors 121.1, 121.2, 121.3. In the example shown, a position is reached where the rotational axis A2 of the cylindrical gearwheel 11 is precisely coincident with the rotational axis A1 of the turntable 130 (referred to as coaxial centering). In this case, the three distance sensors 121.1, 121.2, 121.3 each provide the same output signal (which is representative for the measured distance to the shaft 16), i.e., a.1=a.2=a.3, and the analysis electronics 200 output a signal (e.g., an acoustic signal) or shows a corresponding graphic display on a display screen 201, in order to inform the operator of the supply device 20 that the cylindrical gearwheel 11 must only still be lowered parallel to the z axis and placed on the turntable 130.

The principle for ascertaining the instantaneous eccentricity, or respectively the quality of the coaxial centering, will be explained on the basis of FIGS. 5B and 5C. The figures relate to FIG. 5A. In both figures, a projection in the x-y plane shown. A section through the rotationally-symmetric shaft 16 is shown in FIG. 5B. The light beams of the distance sensors 121.1, 121.2, 121.3 are shown by so-called distance vectors $\vec{a1}, \vec{a2}, \vec{a3}$. If one assumes that the cylindrical shaft 16 hangs approximately parallel to the rotational axis A1 and thus also to the z axis, one can operate using a projection of the vectors in the x-y plane. It is shown in FIG. 5C that the three vectors can be shifted in the coordinate origin and all three vectors can be situated one behind another. In the example shown, the vectors cancel out to zero, which means that the cylindrical shaft 16 is ideally coaxially centered. If one does not operate using a projection of the vectors in the x-y plane, the three-dimensional superposition of the three vectors would also cancel out to zero.

A situation is shown in FIG. 6A in which an externally-toothed cylindrical gearwheel 11 having a central hole 17 is placed on the turntable 130. The light beams of the optical distance sensors 121.1, 121.2, 121.3 (preferably laser sensors 121.1, 121.2, 121.3) are incident on the cylindrical inner surface of the hole 17 and are each reflected back, which allows a runtime measurement in each of the distance sensors 121.1, 121.2, 121.3. In this case, the three distance sensors 121.1, 121.2, 121.3 also provide output signals a.1, a.2, a.3 (which are representative of the particular measured distances to the inner surface of the hole 17) and the analysis electronics 200 output a signal (e.g., an acoustic signal) or shows a corresponding graphic display on a display screen 201, in order to inform the operator of the supply device 20 whether and in which direction the cylindrical gearwheel 11 must still be displaced before it can be lowered parallel to the z axis and placed on the turntable 130.

The principle for ascertaining the instantaneous eccentricity, or respectively the quality of the coaxial centering, will be explained on the basis of FIGS. 6B and 6C. These figures are related to FIG. 6A. In the figures, a projection in the x-y plane shown. A section through the hole having the rotationally-symmetric surface 17 is shown in FIG. 6A. The light beams of the distance sensors 121.1, 121.2, 121.3 are shown by so-called distance vectors $\vec{a1}, \vec{a2}, \vec{a3}$. If one assumes that the precision part 11 and thus also the cylindrical surface 17 hang parallel to the rotational axis A1 and thus also to the z axis, a projection of the vectors in the x-y plane can be used. It is shown in FIG. 6C that the three vectors can be displaced in the coordinate origin and all three vectors can be situated one behind another. In the example shown, however, the vectors do not cancel out to zero, which means that the cylindrical surface 17 is not coaxially centered at the moment. It is obvious from FIG. 6B that the cylindrical surface 17 is ideally centered in relation to the distance sensors 121.1 and 121.3 (i.e., the vectors $\vec{a1}, \vec{a3}$ have equal length), but the surface 17 is displaced parallel to the x axis somewhat in the negative x direction. The measure of this eccentricity is shown in FIG. 6C by the correction vector $\vec{k2}$. If one displaces the precision part 11 in the x direction by suitable movement of the supply device 20 around the correction vector $\vec{k2}$, the coaxial centering is achieved.

One can also operate similarly here using a three-dimensional superposition of the three vectors.

A device 100 in which the radial distance r2 of all distance sensors 121.1, 121.2, 121.3 to the rotational axis A1 is identical and the distance sensors 121.1, 121.2, 121.3 are thus situated in an equilateral triangle 122 (see FIG. 3) is preferred. In this case, all three sensors 121.1, 121.2, 121.3 provide identical signals (i.e., a.1=a.2=a.3 and also $\vec{a1}=\vec{a2}=\vec{a3}$ in every case), if the rotationally-symmetric surface, which is scanned in a contactless manner, is coaxially centered in relation to the rotational axis A1.

Because the precise geometric shape and location of the rotationally-symmetric surface to be scanned is frequently not known, or the parameters of the surface are not provided in the device 100, one is most flexible if the three distance sensors 121.1, 121.2, 121.3 are situated in a consistent, previously known geometric configuration as shown in FIG. 3. Another type of configuration possibly requires complex geometrical recalculations and relation of various coordinate systems to one another by computers.

Figure 7:
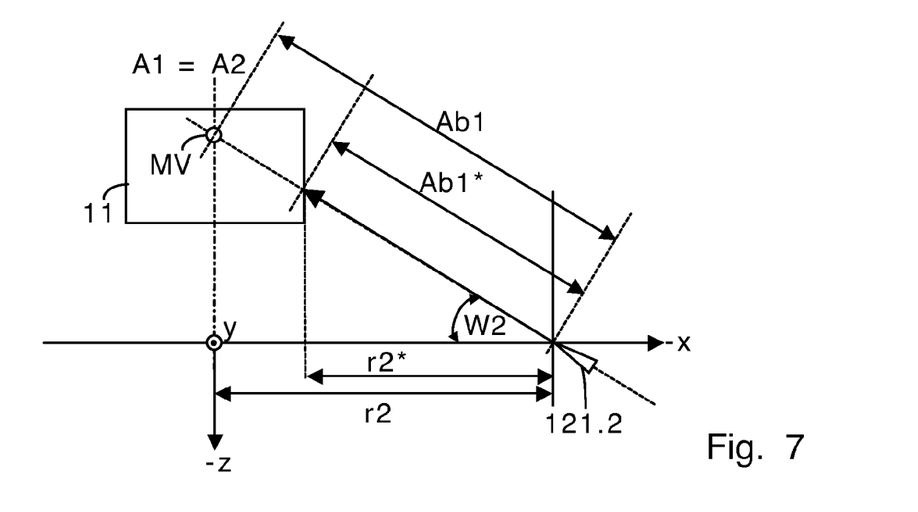
FIG. 7 shows a schematic illustration, which shows a possibility for ascertaining certain geometric variables according to the invention.

The mutual distances a2 are preferably equal (referred to as equidistant configuration of the distance sensors 121.1, 121.2, 121.3) and the radial distance r2 of the three distance sensors 121.1, 121.2, 121.3 is known. If the angle of inclination W2 is additionally known, as shown in FIG. 7, the precise geometric relationships can be ascertained by computer on the basis of trigonometric formulas or using the intercept theorems, for example. If the distance sensors 121.1, 121.2, 121.3 output absolute values (e.g., Ab1*, Ab1* being the length of the corresponding distance vector $\vec{a1}$) for the particular distance, the distance information of the three distance sensors 121.1, 121.2, 121.3 can be related to one another, in order to express the deviation in an x-y coordinate system from the distance information (see FIG. 3 and FIG. 7). The same approach also functions with distance sensors 121.1, 121.2, 121.3 which output relative distance information, if a common reference point (e.g., the point MV) is provided, to which the relative distance information relates.

It can be recognized on the basis of FIG. 7, for example, that the radial distance r2* in the x-y plane may be calculated from the absolute measure distance Ab1*, because the angle W2 in the x-z plane is known. For example, the formula cos(W2)=r2*/Ab1* can be used here. In the illustration shown, the precision part 11 is shown by a cylinder, which is coaxially centered, i.e., A1=A2. If all distance sensors 121.1, 121.2, 121.3 provide an identical Ab1* or an identical r2* (i.e., if a.1=a.2=a.3 and also $\vec{a1}=\vec{a2}=\vec{a3}$), the precision part 11 is ideally centered.

Because the distance sensor 121.2 in FIG. 3, FIG. 5B, FIG. 6B, and FIG. 7 is precisely on the x axis, this distance sensor 121.2 has no influence on the distance on the y axis, because of the y axis is perpendicular to the x axis. Distance values which are ascertained by the distance sensors 121.1 and 121.3 each have a contribution in the x direction and y direction, however. This is because the distance vectors $\vec{a1}$ and $\vec{a2}$ may be decomposed into x coordinate components and z coordinate components.

Optical distance sensors are preferably used as the distance sensors 121.1, 121.2, 121.3, where transmitter and receiver are housed in one housing. These distance sensors 121.1, 121.2, 121.3 preferably operate according to the principle of light runtime measurement.

Such distance sensors 121.1, 121.2, 121.3 may each have one analog output 202.1, 202.2, 202.3, which provides output signals a.1, a.2, a.3 in the range between 0 and 10 V DC, for example. The distance sensors 121.1, 121.2, 121.3 are preferably implemented so that they provide a linear output signal a.1, a.2, a.3 proportional to the distance. If analog output signals a.1, a.2, a.3 are to be processed, the analysis electronics 200 comprise an analog circuit part.

However, distance sensors 121.1, 121.2, 121.3 may also be used, which provide digital output signals a.1, a.2, a.3. If digital output signals a.1, a.2, a.3 are to be processed, the analysis electronics 200 comprise a corresponding digital circuit part.

Distance sensors having a digital output signal which provide an absolute distance signal via a serial interface are particularly preferred.

It is to be noted here that the analysis electronics 200 can be designed so that they directly activate a display screen 201. The analysis electronics 200 can also be designed so that they provide signals to a computer, which assumes the display on a display screen 201.

In a further embodiment, the distance sensors 121.1, 121.2, 121.3 comprise optical waveguides (e.g., glass optical fibers) and/or optical elements (such as lenses or mirrors), in order to send laser light along the measurement axes 124.1, 124.2, 124.3 in the direction of the precision part 11. Through the use of such optical waveguides and/or optical elements, the electronics of the distance sensors 121.1, 121.2, 121.3 can be placed at a different location. Less interference and damage thus occurs. A configuration is also possible through this measure, where only one laser source is used, but it sends light to the precision part via various pathways.

According to the invention, a lifting tool in the form of a crane, preferably a ceiling or indoor crane, is preferably used as the supply device 20. Using such a crane 20, the precision part 11 can be held floating above the turntable 130 in a first step. The precision part 11 is connected at least three points to the crane 20 for this purpose, the crane 20 being remote controllable by operators. The precision part 11 can also be suspended at only one central point, however. It is shown in FIGS. 5 and 6 that the precision part 11 can be provided with three eyes 21 or the like, in order to fasten cables or chains 22 on these three eyes 21. The three cables or chains 22 may be guided together overhead at a suspension point 23, in order to fasten a single lifting cable or a single lifting chain at this suspension point 23, which leads upward and runs around a cable or chain roll of the crane 20, for example. In addition to the suspension point, a coordinate system is shown, in order to indicate that the crane 20 is preferably movable in three axial directions. The radii of the three fastening points for the cable 22 to the workpiece axis are preferably equal. In this case, the lengths of the cables 22 must be equal to one another. If this condition is not met, the workpiece axis is not parallel to A1. There are also central fastening points having only one cable. The invention may also be used in this case.

The device 100 preferably comprises a display screen 201, on which a schematic targeting system is shown, preferably in the form of crosshairs. The display on the display screen 201 can be performed directly (e.g., by direct activation on the part of the analysis electronics 200) or indirectly (e.g., using an interposed computer) on the basis of the output signals a.1, a.2, a.3 of the three distance sensors 121.1, 121.2, 121.3.

A diagram is preferably shown on the display screen 200, which shows the center point of the turntable (rotational axis A1), on one hand, and the actual position of the rotational axis A2 of the precision part, on the other hand. This actual position is ascertained on the basis of the output signals a.1, a.2, a.3 and displayed immediately on the display screen in each case. The directions are preferably also shown in this diagram, so that an operator of the device 100 can readily recognize in which direction he must control the crane in order to achieve coaxial centering.

The analysis electronics 200 are preferably designed so that they recognize a swaying or vibrating load via computer. A warning signal or a visual signal can thus be displayed in order to communicate to the operator that he is to wait until the swaying or vibrating has abated. In order to recognize swaying or vibrating, for example, sequential output signals a.1, a.2, a.3 may be compared to one another. If these output signals a.1, a.2, a.3 deviate from one another, the device 100 is not at rest and a waiting period is to occur. It has been shown that because of the great weights which are moved here, such swaying and vibrating is damped rapidly.

The cited graphic display for targeting is preferably superimposed on the display screen 201 on an image, which is recorded using a camera. This camera is preferably seated above the device 100 (e.g., on the crane 20). The operability is further simplified by this type of display, because the operator receives further visual indications which allow rapid and targeted centering.

Figure 4:
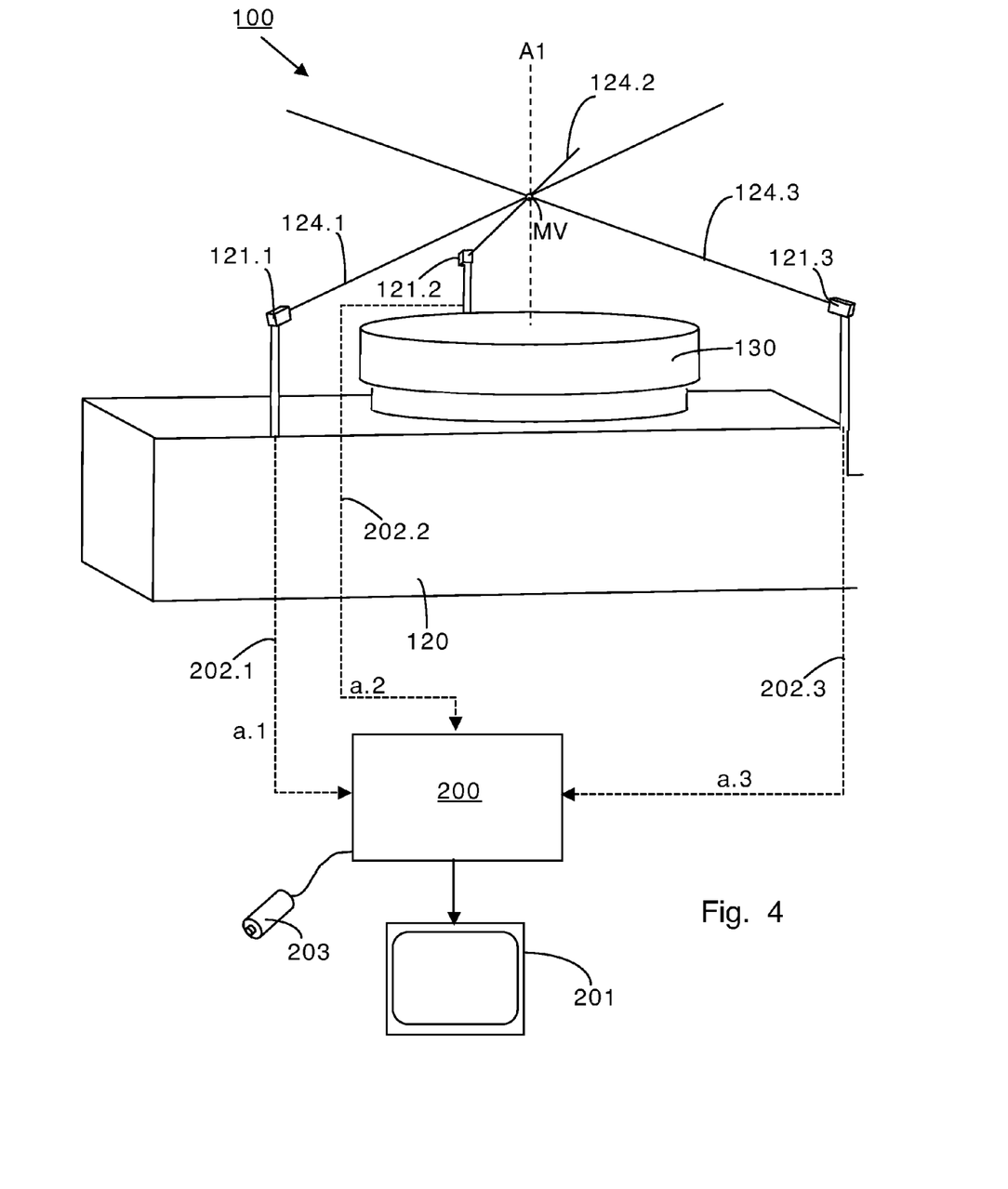
FIG. 4 shows a further perspective partial view of a first measuring device according to the invention.

As shown in FIG. 4, the device 100 can also be provided with a switch or button 203, which only performs a distance measurement upon actuation like a trigger. This switch or button 203 is optional. The function of this switch or button 203 can also be performed via a connected computer.

Embodiments are also possible in which only two distance sensors are used. This is possible if the radius or diameter of the rotationally-symmetric testing surface of the precision part is known through a workpiece drawing, for example. If the radius or diameter is input into the analysis electronics/analysis software 200 of the distance sensors, the device 100 is also usable without restrictions using only two distance sensors. If only two distance sensors are used, the angle between the two distance sensors is preferably 90°.

In the scope of the present invention, a turntable 130 for receiving a precision part 11 has been discussed at various times. It is to be noted here that the invention may also be used, of course, on turntables 130 which are constructed or implemented differently than the turntables 130 described and shown in the figures. A turntable can be equipped with means for chucking or clamping the precision part, for example, and/or the turntable can have a structured surface. It is only important that the turntable 130 is designed for the centered accommodation of a precision part 11.

If small errors result during placement of the precision part, they may be compensated for by the measuring device 100.

| List of reference numerals | |
|---|---|
| measuring system | 10 |
| precision part | 11 |
| | 12 |
| lower centering tip | 13 |
| turntable | 13.1 |
| upper centering tip | 14 |
| arm | 14.1 |
| double arrows | 14.2 |
| sensor(s) | 15 |
| double arrows | 15.1, 15.2, 15.3, 15.4 |

-continued

| List of reference numerals | |
|---|---|
| shaft | 16 |
| hole | 17 |
| supply device | 20 |
| eyes | 21 |
| cable | 22 |
| suspension point | 23 |
| device | 100 |
| machine bed | 120 |
| distance sensors | 121.1, 121.2, 121.3 |
| equilateral triangle | 122 |
| auxiliary circle | 123 |
| measurement axes | 124.1, 124.2, 124.3 |
| turntable | 130 |
| arm | 140 |
| measuring tower | 141 |
| lateral carriage | 142 |
| second lateral carriage | 143 |
| measuring feeler | 150 |
| analysis electronics | 200 |
| display screen | 201 |
| output lines | 202.1, 202.2, 202.3 |
| feeler | 203 |
| vertical rotational axis | A1 |
| vertical rotational axis | A2 |
| distance | Ab1 |
| effective distance | Ab1* |
| distance vectors | $\vec{a}1, \vec{a}2, \vec{a}3$ |
| output signals | a.1, a.2, a.3 |
| distances | a2 |
| radius of the plate | r1 |
| radial distance | r2 |
| effective radial distance | r2* |
| correction vector | $\vec{k}2$ |
| laser beam | L |
| virtual measuring point | MV |
| angle in x-z plane | W1 |
| angle of inclination | W2 |
| x, y z | coordinates |

The invention claimed is:

1. A device comprising: a turntable for receiving a precision part, this precision part being able to be placed using a supply device on the turntable, and the turntable having a central, vertical rotational axis, wherein the device comprises analysis electronics and at least two distance sensors, which operate in a contactless manner, and which
are situated in a previously known geometrical configuration to the rotational axis, and
have measurement axes radially oriented in the direction of the rotational axis so that the measurement axes of the distance sensors meet in a virtual measuring point, which is on the rotational axis,
are connectable to the analysis electronics via circuitry, output signals of the distance sensors being processable on the basis of the analysis electronics, in order to allow coaxial centering of the precision part in relation to the rotational axis upon placement of the precision part on the turntable.

2. The device according to claim 1, wherein three distance sensors are used and a geometric configuration of the distance sensors is selected so that the distance sensors are situated at equidistant mutual distances around the turntable.

3. The device according to claim 2, wherein a radial distance of all distance sensors to the rotational axis is identical and the distance sensors are thus situated in an equilateral triangle.

4. The device according to claim 2, wherein the distance sensors are optical distance sensors.

5. The device according to claim 2 wherein the distance sensors are laser sensors, which measure a distance to the precision part using runtime measurement, said distance sensors directing laser light along the measurement axes on a rotationally-symmetric surface of the precision part.

6. The device according to claim 1, wherein the precision part is a gearwheel, a shaft, a shank, or a worm, which has a weight of greater than 100 kg, at least one rotationally-symmetric surface being provided on this precision part, which is directly reachable from below through the measurement axes upon lowering of the precision part onto the turntable using the supply device.

7. The device according to claim 1, wherein the supply device is a lifting tool, preferably a ceiling or indoor crane, and the precision part is connected to the lifting tool from above at one or three points, the lifting tool being remotely controllable by operators or a computer.

8. The device according to claim 1, wherein a display screen, on which a schematic targeting system is shown, preferably in the form of crosshairs, is provided in the area of the device, the display on the display screen being produced directly or indirectly on the basis of the output signals of the distance sensors.

9. The device according to claim 1, wherein it is a measuring device for measuring a precision part or a machine tool for machining a precision part.

10. A method for positioning a precision part on a turntable of a device, said method comprising the following steps:
fastening the precision part to a lifting tool,
supplying the precision part using the lifting tool into a position in which the precision part floats above the turntable,
automatically executing a contactles distance measurement using at least two distance sensors, whose measurement axes are oriented in the direction of a rotationally-symmetric surface of the precision part,
analyzing output signals of the distance sensors, in order to allow a statement about the coaxial centering of the precision part in relation to a rotational axis of the turntable,
outputting acoustic or visual information, which allows a statement about an actual position of the precision part in relation to the turntable,
controlling the lifting tool, in order to achieve coaxial centering of the precision part in relation to the rotational axis of the turntable.

11. The method according to claim 10, wherein
each of the distance sensors emits laser light in the direction of the precision part and collects laser light,
the laser light is reflected by a rotationally-symmetric surface of the precision part, and
the distance between each distance sensor and a rotationally-symmetric surface is ascertained on the basis of a runtime measurement.

12. The method according to claim 10, wherein the step of outputting is performed using visual information and a targeting diagram is displayed on a display screen, which allows a statement about the actual position of the precision part in relation to the rotational axis.

13. The method according to claim 12, wherein an image, which was recorded by a camera, is superimposed on the targeting diagram.

14. The device according to claim 7, wherein a display screen, on which a schematic targeting system is shown, preferably in the form of crosshairs, is provided in the area of the device, the display on the display screen being produced directly or indirectly on the basis of the output signals of the distance sensors.

* * * * *